(No Model.) J. QUAGLIO. 2 Sheets—Sheet 1.

FURNACE FOR REDUCING ZINC AND OTHER METALS.

No. 312,759. Patented Feb. 24, 1885.

WITNESSES:

INVENTOR
Julius Quaglio
BY
ATTORNEYS.

(No Model.) 2 Sheets—Sheet 2.
J. QUAGLIO.
FURNACE FOR REDUCING ZINC AND OTHER METALS.
No. 312,759. Patented Feb. 24, 1885.
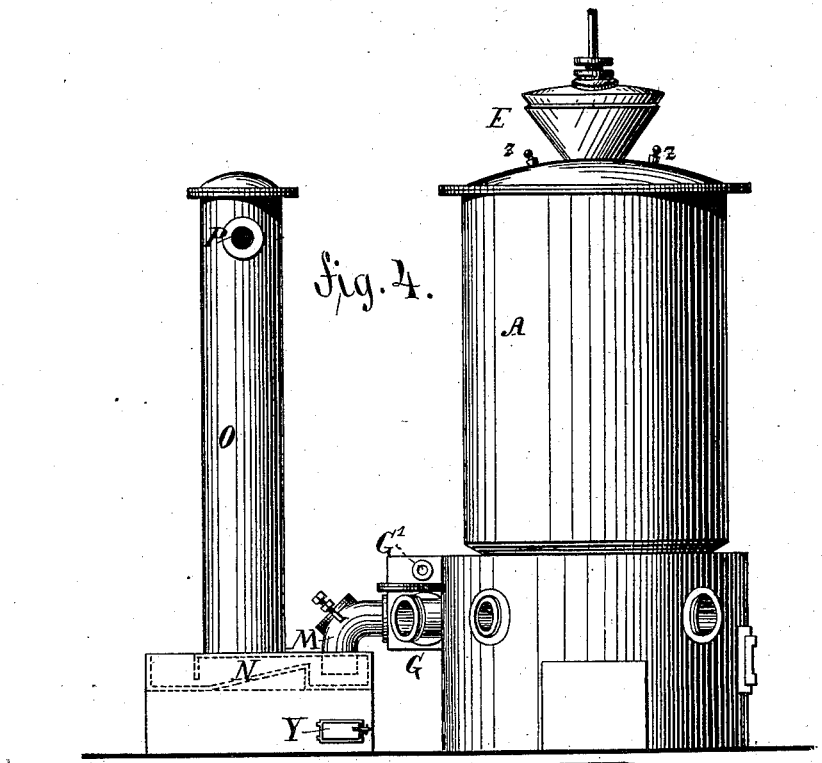
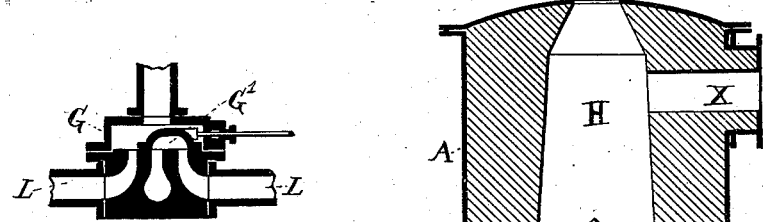
WITNESSES:
INVENTOR
BY
ATTORNEYS.

UNITED STATES PATENT OFFICE.

JULIUS QUAGLIO, OF FRANKFORT-ON-THE-MAIN, PRUSSIA, ASSIGNOR TO HIMSELF, JULIUS PINTSCH, OF BERLIN, AND AUGUST LENTZ, OF STETTIN, GERMANY.

FURNACE FOR REDUCING ZINC AND OTHER METALS.

SPECIFICATION forming part of Letters Patent No. 312,759, dated February 24, 1885.

Application filed April 9, 1884. (No model.)

*To all whom it may concern:*

Be it known that I, JULIUS QUAGLIO, a subject of the King of Bavaria, Germany, residing at the city of Frankfort-on-the-Main, in the Kingdom of Prussia, Germany, have invented certain new and useful Improvements in Furnaces for Reducing Zinc and other Metals, of which the following is a specification.

This invention has reference to an improved reducing or smelting furnace for zinc or other metals, in which the outgoing carbonic acid originating during the reducing or smelting process is reduced to carbonic oxide. In this manner a large quantity of heat is saved and carbonic oxide obtained for combustion.

Figure 1:
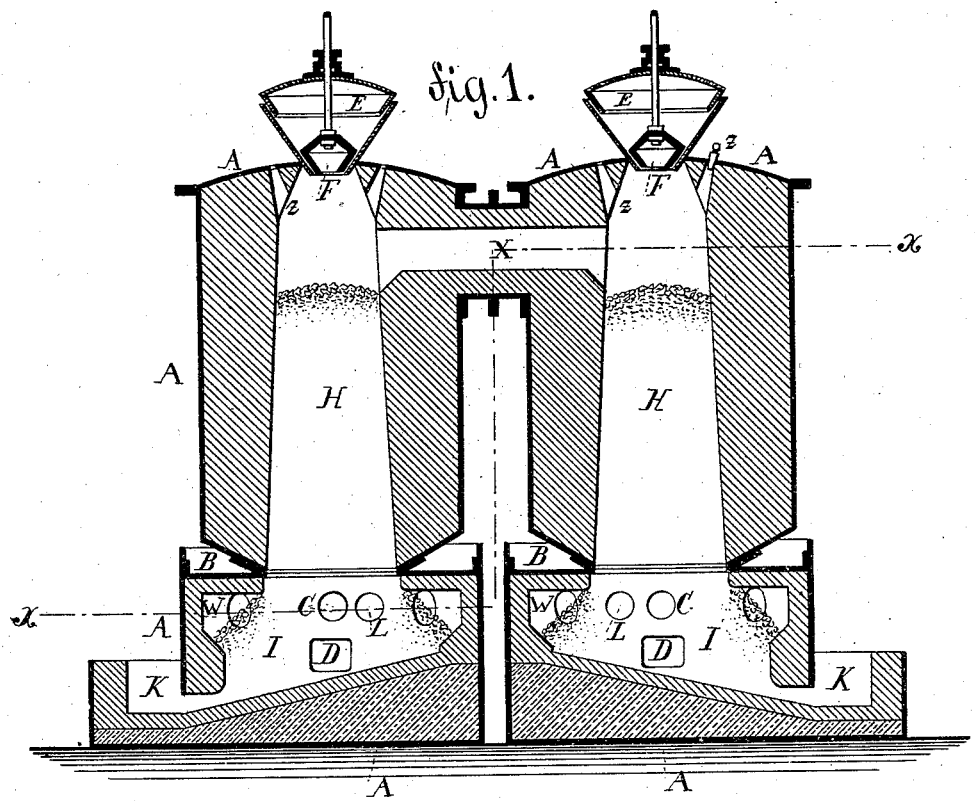
Figure 2:
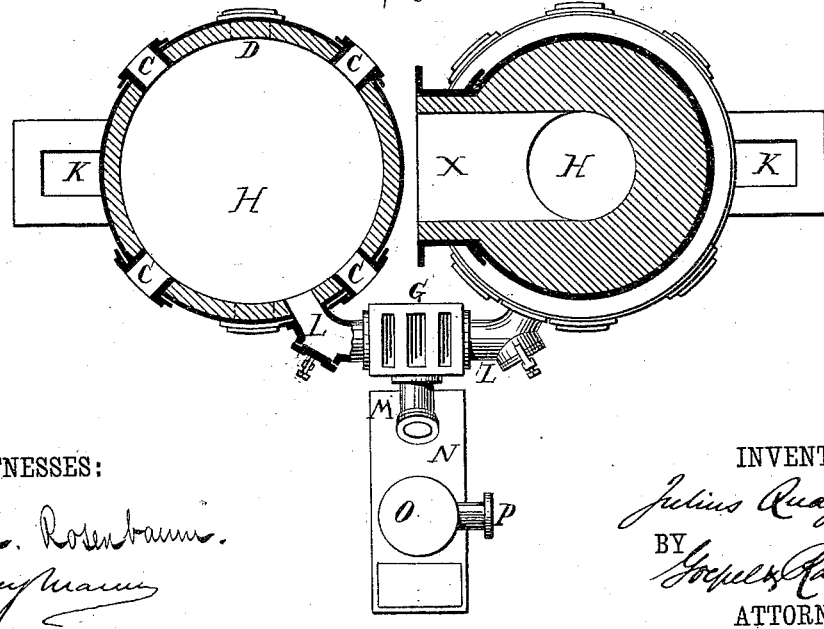

In the accompanying drawings, Figure 1 represents a vertical longitudinal section of my improved reducing-furnace for zinc and other metals, with the gas-burning chamber omitted. Fig. 2 is a horizontal section of the same on line $x\,x$, Fig. 1. Fig. 3 is a detail showing the air and gas regulating slide-valve. Fig. 4 is a side elevation, and Fig. 5 a sectional view.

Similar letters of reference indicate the same parts throughout the several views.

H H in the drawings represent two smelting-furnaces of equal size, which are arranged symmetrically to each other and connected by a channel, X, at the upper ends of the shafts. The furnaces H H and the channel X are inclosed by a gas-tight covering of iron plates, and provided at the throat portions with open annular water-boshes B. The crucible or hearth I of the furnace is enlarged, whereby the descending charge leaves an annular space, W, between it and the wall of the crucible, for drawing off the gases and admitting the air. The sloping bottom of the hearth I conducts the molten metal to the breast-pan K, while the slag and ashes are drawn off through openings C and D, which are kept closed during the smelting-process by iron doors provided with suitable fastenings.

The furnaces are continuously supplied through top hoppers, E, by removing the plugs F, with the required charge of coal, ore, and flux. The top openings, $z\,z$, serve for the introduction of the stirrers to push down the charge.

From the crucible I of each furnace H a pipe, L, leads to a valve-chest, G, provided with a slide-valve, G', for the alternating supply of air and discharge of gases. The valve-chest G is connected by a bent pipe, M, with the condenser N, which may be heated by the furnace Y, and with a cooler, O, having at its upper end an outlet-pipe, P, for the carbonic oxide. The outlet-pipe may be connected to a suction-fan for drawing off the gases. The valve-chest G may also be connected with a hot blast, in which case the top of the chest is entirely closed, and connected to a pipe connecting with the hot-air generator. Simultaneously with the air steam can be introduced, whereby, besides carbonic oxide, hydrogen gas is obtained by the decomposition of the steam. The slide-valve G' may be cooled with water or molten metal.

The reducing-furnace is operated as follows: Both shafts H are filled with coal and lighted at the annular space W. The suction-fan connected with the outlet-pipe P is set in motion, whereby atmospheric air required for combustion is passed through the open port of the valve-chest G into the crucible of one furnace, while the gases of combustion are drawn off from the top of the same furnace through the channel X, and through the other furnace, pipe L, slide-valve G', and pipe M to the condenser N and cooler O, and finally conducted to a gas-reservoir. As soon as the fuel in the first furnace is at red heat the slide-valve is shifted, and the same course of air and gases, but in opposite direction to the former course, takes place. When the fuel of the second furnace is at red heat, the charge is introduced to the furnaces through the supply-hoppers E E.

The process of reduction in the furnace is going on as follows: The reduced metals, which remain in a liquid state, are collected in the breast-pan K. The gaseous metals and metallic oxides are conducted into the second furnace, in which they are entirely reduced, while simultaneously the carbonic acid present in the vapors is changed to carbonic oxide. The vapors are drawn off and condensed in the condenser N. The carbonic-oxide gas is conducted to and stored up in a gas-reservoir, and can then be utilized for heating purposes.

If it be desired to use the furnace for the direct reduction of sulphuret of zinc with coal, in which case sulphuret of carbon is generated, a condenser filled with water is interposed between the outlet-pipe P and the exhaust-fan.

In case refractory ores—ores containing a large percentage of slag or coal of poor quality—are to be used, higher temperatures than those obtained by the partial oxidation of the coal to carbonic oxide are required. These temperatures may be obtained in different ways: first, by raising the temperature of the atmospheric air required for combustion by any known apparatus for heating air, for which purpose a part of the gases drawn off from the furnace may be employed; secondly, a part of the drawn-off gases is burned in a closed fire-chamber, which is located at the interior of the furnace-shaft and made of fire-proof material. The walls of the interior fire-chamber are raised thereby to white heat, and consequently the surrounding space of the shaft raised to the same temperature.

In Fig. 5 I show the interior gas-burning chamber of my furnace, to which different forms may be given. It is made of pyramidal form and extended from the bottom of the hearth into the lower part of the shaft of the furnace.

The combustible gases, obtained in the manner hereinbefore described, are conducted through the channels Q at the bottom of the fire-chamber and burned in the space S. The atmospheric air required for combustion is drawn in through the channel R. The gases of combustion are conducted through channels T and U to the channel V, which communicates with the chimney, or with Siemens' regenerative chambers, for raising the temperature of the incoming gas or air mixture.

Having thus described my invention, I claim as new and desire to secure by Letters Patent—

The combination of the symmetrically-arranged ore-smelting furnaces H H, connected at their upper parts by a transverse channel, X, pipes L L, connecting with openings of the crucibles I I of the furnaces, a valve-chest, G, and slide-valve G', a gas-conducting pipe, M, condenser N, cooler O, and suction-pipe P, substantially as described.

In testimony whereof I have signed my name to this specification in the presence of two subscribing witnesses.

JULIUS QUAGLIO.

Witnesses:
GERARD VON NAUROCKI,
B. ROI.